US012087169B2

(12) United States Patent
He et al.

(10) Patent No.: US 12,087,169 B2
(45) Date of Patent: Sep. 10, 2024

(54) METHODS AND SYSTEMS FOR HIGHLIGHTING GROUND TRAFFIC ON COCKPIT DISPLAYS

(71) Applicant: HONEYWELL INTERNATIONAL INC., Morris Plains, NJ (US)

(72) Inventors: Zuowei He, Shanghai (CN); Gang He, Morristown, NJ (US); Haidong Huang, Jiangxi Province (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 25 days.

(21) Appl. No.: 16/808,736

(22) Filed: Mar. 4, 2020

(65) Prior Publication Data

US 2021/0280069 A1   Sep. 9, 2021

(51) Int. Cl.
| | |
|---|---|
| *G08G 5/00* | (2006.01) |
| *B64D 43/00* | (2006.01) |
| *B64D 47/08* | (2006.01) |
| *G01C 23/00* | (2006.01) |
| *G08G 5/04* | (2006.01) |

(52) U.S. Cl.
CPC ........... *G08G 5/0013* (2013.01); *B64D 43/00* (2013.01); *B64D 47/08* (2013.01); *G01C 23/005* (2013.01); *G08G 5/0021* (2013.01); *G08G 5/0078* (2013.01); *G08G 5/045* (2013.01)

(58) Field of Classification Search
CPC .. G08G 5/0013; G08G 5/0078; G08G 5/0021; G08G 5/045; G08G 5/065; B64D 47/08; B64D 43/00; G01C 23/005
See application file for complete search history.

(56) References Cited

U.S. PATENT DOCUMENTS

| | | | |
|---|---|---|---|
| 7,826,666 B2 | 11/2010 | Hamza et al. | |
| 8,040,258 B2 | 10/2011 | Ibrahim et al. | |
| 8,094,188 B1 | 1/2012 | Yum et al. | |
| 8,209,122 B2 | 6/2012 | Nichols et al. | |
| 8,744,760 B1 | 6/2014 | Mishmash et al. | |
| 9,105,115 B2 | 8/2015 | Feyereisen et al. | |
| 9,176,324 B1 | 11/2015 | Scherer et al. | |
| 9,189,964 B1 | 11/2015 | Rathinam et al. | |
| 9,355,567 B2 | 5/2016 | Krishna et al. | |
| 9,384,586 B1 | 7/2016 | Jinkins et al. | |

(Continued)

FOREIGN PATENT DOCUMENTS

EP    2416124 A2    8/2012

*Primary Examiner* — Sizo B Vilakazi
*Assistant Examiner* — Diem T Tran
(74) *Attorney, Agent, or Firm* — Lorenz & Kopf LLP (57) ABSTRACT

Systems and methods are disclosed that receiving ground traffic data from a traffic computer, and enhanced vision system, EVS, imaging data from at least one EVS camera. A target area is determined in the EVS imaging data based on position data of the ground traffic data. Graphics processing is performed that is confined to the target area to enhance visibility of ground traffic in the EVS imaging data in the target area, thereby generating enhanced EVS imaging data. The graphics processing is selected from at least one of contrast enhancement, edge detection and template matching and highlighting of an outline of the ground traffic. A display is generated that is to be displayed on the display device based on the enhanced EVS imaging data and the EVS imaging data.

7 Claims, 5 Drawing Sheets

(56) References Cited

U.S. PATENT DOCUMENTS

| | | | |
|---|---|---|---|
| 9,501,938 B1 | 11/2016 | Olson et al. | |
| 10,001,376 B1 | 6/2018 | Tiana et al. | |
| 10,109,054 B1 | 10/2018 | Wilson et al. | |
| 10,225,520 B2 | 4/2019 | Deng et al. | |
| 10,302,759 B1 | 5/2019 | Arteaga | |
| 10,410,530 B1* | 9/2019 | Kant | G08G 5/0026 |
| 2009/0138871 A1* | 5/2009 | Kimberly | H04L 67/06 |
| | | | 717/173 |
| 2010/0039294 A1 | 2/2010 | Feyereisen et al. | |
| 2012/0035789 A1* | 2/2012 | He | G01C 23/005 |
| | | | 701/16 |
| 2013/0188049 A1* | 7/2013 | Koukol | G08G 5/0021 |
| | | | 348/E7.085 |
| 2014/0285661 A1* | 9/2014 | Feyereisen | G08G 5/0026 |
| | | | 348/148 |
| 2015/0329217 A1* | 11/2015 | Kirk | G08G 5/0078 |
| | | | 701/301 |

* cited by examiner

METHODS AND SYSTEMS FOR HIGHLIGHTING GROUND TRAFFIC ON COCKPIT DISPLAYS

TECHNICAL FIELD

The present disclosure generally relates to enhanced display of ground traffic and associated systems, methods and software. The present disclosure more particularly relates to including ground traffic highlighting in displays that use enhanced vision system imaging.

BACKGROUND

Aircraft include display systems to convey flight path and/or flight management information with imaging or visual display data as a background. One type of display system including visual or imaging data is an enhanced vision (EV) system. An EV system uses an infrared (IR) and/or millimeter wave (MMW) video camera to sense thermal signatures of objects and to render images based on the sensed thermal signatures on a display. EV system displays can significantly increase pilot situational awareness, but the nature of thermal images is that similar temperature features are difficult to differentiate. Ground traffic may not always be clearly shown in EV system displays.

Another type of display system is a synthetic vision (SV) system. An SV system operates by rendering an image based on pre-stored database information and/or flight measurement information. For example, an SV image may include flight management data, e.g., heading, altitude, and speed, superimposed on a synthetic rendering of terrain and objects such as a runway and a taxiway, some of which may be of a range for detection by an EV system or not clearly shown in EV images. Thus, SV images can provide the vehicle operator with an effective interface for vehicle control.

Some display systems display both an SV image and an EV image as a fused (merged) image (such as overlaying an EV image onto an SV image) or as a side-by-side display. The images may be indexed at the time of camera installation, e.g., by aligning an EV image sensor to ensure that the sensor and the SV view are indexed. Although such an overlaid "enhanced synthetic vision system" display may be useful, identification of ground traffic data may be limited by the ability to differentiate ground traffic in the EV imaging.

EV systems and fused SV and EV systems can provide a visual advantage of two to three times over that of an out-the-window (OTW) view during low visibility condition because of weather (mist or fog) and night time. The EV system allows pilots to view the runway environment potentially including ground traffic (traffic intruder), specifically intruder's lights, before they would be seen in an OTW view with natural vision. Nonetheless, improvements to visualization of ground traffic are desirable.

Accordingly, it is desirable to provide methods and systems for highlighting ground traffic on EV system cockpit displays. In addition, it is desirable to ensure response times and processing burden are kept low to ensure that there is no or minimal additional latency as a result of ground traffic highlighting processes. Also, any highlighting should accurately represent a location of the ground traffic and should not wholly substitute the EV imaging of the ground traffic in the cockpit display. Furthermore, other desirable features and characteristics will become apparent from the subsequent detailed description and the appended claims, taken in conjunction with the accompanying drawings and the foregoing technical field and background.

BRIEF SUMMARY

Systems and methods described herein provide one or more processors that perform the following steps. Ground traffic data is received from a traffic computer, and enhanced vision system, EVS, imaging data is received from at least one EVS camera. A target area is determined in the EVS imaging data based on position data of the ground traffic data. Graphics processing is performed that is confined to the target area to enhance visibility of ground traffic in the EVS imaging data in the target area, thereby generating enhanced EVS imaging data. The graphics processing is selected from at least one of contrast enhancement, edge detection and template matching and highlighting of an outline of the ground traffic. A display is generated that is to be displayed on the display device based on the enhanced EVS imaging data and the EVS imaging data. In some embodiments described herein, other graphics processing steps are performed than contrast enhancement, edge detection and template matching and highlighting of an outline of the ground traffic.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components and/or modules, and with reference to symbolic representations of operations, processing tasks, and functions that may be performed by various computing components or devices.

Such operations, tasks, and functions are sometimes referred to as being computer-executed, computerized, software-implemented, or computer-implemented. It should be appreciated that the various block components and modules shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. In certain embodiments, the program or code segments or programming instructions are stored in a tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

Figure 1:
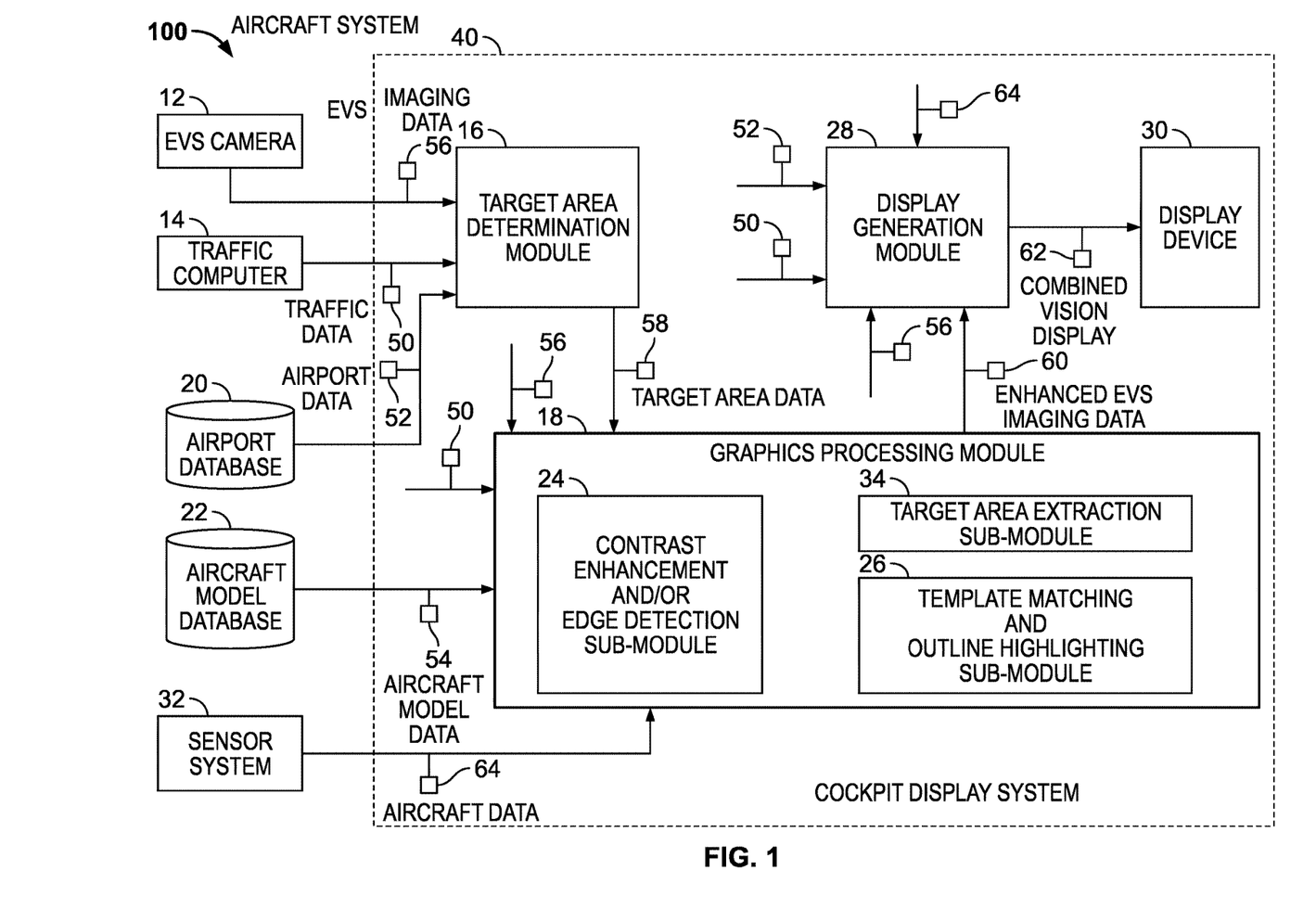
FIG. 1 illustrates a block diagram of an aircraft system including a cockpit display system for highlighting ground traffic in EV system displays, in accordance with embodiments of the present disclosure.

Referring to FIG. 1, a cockpit display system 40 is shown in block diagram form, in accordance with an exemplary embodiment. Cockpit display system 40 includes a traffic computer 14 for generating alerts from a Surface Indications and Alerts System (Surf-IA) for potential ground traffic collision. Traffic computer 14 is configured to produce Automatic Dependent Surveillance-Broadcast (ADSB) traffic data 50 to cockpit display system 40. In embodiments, the ground traffic data 50 includes traffic tail number, position, velocity, bearing, heading, and other data features.

An EV (Enhanced Vision) System camera 12 is configured to generate and supply real time (with some inherent latency (e.g. a maximum latency of 100 ms) including display logic) EVS imaging data 56 to cockpit display system 40. Cockpit display system 40 is configured, in one embodiment, as a CVS (Combined Vision System), which combines EVS image data and SVS (Synthetic Vision System) data. In embodiments described herein, aircraft system 100 includes an aircraft model database 22 (e.g. a comprehensive 3D model aircraft database) to enable aircraft type associated with the received tail number to be identified and a representative aircraft template to be included as synthetic data in the EV system imaging data when generating a combined vision display. That is, a combined vision display includes an aircraft model from aircraft model database 22 (suitably scaled and rotated) located at the position of a traffic intruder in the EV imaging data 56 to provide a proper synthetic representation of the traffic intruder. It should be appreciated that whilst the present disclosure is described primarily in terms of aircraft traffic intruders, other ground traffic may be similarly modelled and represented in the combined vision display.

Cockpit display system 40 includes graphics processing module 18 for performing a variety of functions and various software processing steps. In one embodiment, a target area 306 (see FIGS. 3b to 3e) is selected based on position of ground traffic as determined from ground traffic data 50. That is, target position and velocity from ADS-B traffic data is used to determine an initial position of the target intruder and the target area is defined adaptively by further taking into account inaccuracy and latency of the ground traffic data 50. The target area 306 may be narrowed down by excluding impossible/unlikely positions of the target in the real world using airport data 52 from airport database 20 as another input to adjust the target area 306. That is, positions are excluded by assuming that the target can only valid places (taxiway or runway, for example) as defined by airport data 52 from airport database 20.

Graphics processing module 18 is configured to perform various graphics processing operations on the target area 306 of the EVS imaging data 56. Graphics processing includes contrast and outline enhancement and potentially augmentation to offer better recognition degree of the intruder from the image. Since the graphics processing only applies to the target area 306, burden on system resources (such as CPU/GPU/Memory) is reduced as compared to performing graphics processing on the whole image. The graphics processing allows the target area 306 to be differentiated and also the target intruder to be further highlighted in enhanced EVS imaging data 60 relative to surrounding EVS imaging data 56 in a combined vision display shown by display device 30. In some embodiments, the target area 306 is highlighted (e.g. by outlining) in addition to the inherent outlining provided by contrast and edge enhancement in the display of display device 30 to assist crew in intruder identification and decision making.

Furthermore, the present disclosure envisage precise intruder recognition when possible and highlighting of the recognized intruder outline in the display, by searching for the intruder outline within the target area 306 of EVS imaging using an aircraft template from the aircraft model database 22. In embodiments, the aircraft template includes aircraft lights and outline and is scaled and rotated. Graphics processing steps to generate aircraft template includes identifying aircraft frame of the intruder by using tail number from ADS-B traffic data 50), calculate the projected size based on the distance to ownship and 3D geometric rotation on aircraft template through relative lateral and vertical bearing angle and the intruder's heading. In embodiments, a searching and matching algorithm is performed for identifying position of scaled and rotated aircraft template in target area 306. The searching and matching algorithm may include pattern matching between aircraft lights of template and captured lights on target area and matching outline between aircraft template and captured image in target area 306 if aircraft lights matched.

Having described embodiments of FIG. 1 as an overview in the foregoing, embodiments of the present disclosure will be further described in greater detail with further reference to aircraft system 100 of FIG. 1. Aircraft system 100 includes an EVS Camera 12, a traffic computer 14, an airport database 20, an aircraft model database 22, a sensor system 32 and a cockpit display system 40. As would be appreciated by one of skill in the art, aircraft system 100 includes many further systems, sub-systems, modules, hardware and software, which are not described herein for the sake of brevity. Cockpit display system 40 includes a target area determination module 16, a display generation module 28, a display device 30 and a graphics processing module 30. Graphics processing module 18 includes a target area extraction sub-module 34, a contrast enhancement and edge detection sub-module 24 and a template matching and outline highlighting sub-module 26. In accordance with various embodiments, modules and sub-modules of cockpit display system 40 are implemented by computer program instructions (not shown) stored on memory (not shown) of aircraft system 100. One or more processors (not shown) of aircraft system 100 are configured to execute the computer program instructions to carry out functions and method steps as described further herein.

In embodiments, Enhanced flight Vision System (EVS) camera 12 is an airborne system that captures a forward-looking scene for display through display device 30 so as to provide a display that is better than unaided human vision. EVS camera 12 includes imaging sensors (one or more) such as a color camera and an infrared camera or radar. EVS camera 12 includes, in embodiments, a millimeter wave radar (MMW) based imaging device, a visible low light television camera, one or more InfraRed cameras (possibly including more than one infrared camera operating at differing infrared wavelength ranges) and any combination thereof to allow sufficient imaging in poor visibility conditions (e.g. because of night time operation or because of inclement weather). In embodiments, EVS camera 12 is mounted in or near the nose of aircraft of aircraft system 100.

In embodiments, traffic computer 14 is configured to receive and process information from one or more sources in order to generate traffic data 50. Traffic data 50 may be obtained from broadcast mechanisms, such as, traffic information service-broadcast (TIS-B), Automatic Dependent Surveillance-Broadcast (ADS-B), and Automatic Dependent Surveillance-Rebroadcast (ADS-R), or via Traffic Alert and Collision Avoidance System (TCAS) or any combination thereof. Information may be broadcast from air traffic control or other ground station broadcasts, other aircraft and other ground vehicles. In embodiments, traffic computer 14 is configured to process ADS-B data (among other data inputs) received by an ADS-B receiver (not shown) and output traffic data 50 via one or more communication buses. In some embodiments, traffic computer 14 receives information regarding traffic from other aircraft, ground vehicles, and ground systems to compute traffic states that may include position, velocity, acceleration, time, altitude, heading, aircraft/vehicle size, systems status, phase of operation, vehicle identifier (e.g. tail number), etc. Traffic computer 14 is configured to provide Surface Indications and Alert System (SURF IA), which uses a combination of ADS-B, algorithms and flight data analysis to provide pilots visual and audio warnings about approaching hazards (target intruders) on or near a runway. For at least those target vehicles that are subject to SURF IA alert, and possibly others, traffic computer 14 is configured to output traffic data 52 that includes, in embodiments, position, speed, bearing, heading and an identifier for ground traffic for subsequent processing by cockpit display system to enhance visibility of one or more ground traffic vehicles subject to the SURF IA alert.

Onboard active sensor systems, such as a weather radar or millimeter wave radar, may be used to detect the ground target and to generate the current location of the target based on the relative position of the target to the ownship position.

In accordance with various embodiments, sensor system 32, which may be incorporated into a flight management system, includes airline-quality GPS receivers (or other Global Navigation Satellite System (GNSS) receivers) that act as a primary sensor for determining position of ownship aircraft. GNSS systems are meant to encompass at least one satellite constellation-type system (e.g., Global Positioning System (GPS), Global Navigation Satellite System (GLONASS), Galileo, etc.), and may also include one or more augmentation system (e.g., Satellite Based Augmentation System (SBAS), Ground Based Augmentation System (GBAS), Ground-based Regional Augmentation System (GRAS)). Sensor system 32 may further include radio aids designed for aircraft navigation for determining position of ownship aircraft. Further additional or alternative sensors include scanning distance measuring equipment (DME) that check the distances from different DME stations simultaneously in order to determine position, VORs (VHF omnidirectional radio range) that are able to supply a position when there are two or more VOR stations, inertial reference systems (IRS) use gyroscopes and accelerometers in order to calculate aircraft position. In some embodiments, a combination of any of the aforementioned sensors are used by sensor system 32 to determine ownship aircraft position. In embodiments, sensor system 32 is configured to output aircraft data 64 including aircraft state such as position, velocity, acceleration, time, altitude, heading, aircraft attitude, vehicle size, systems status, phase of operation, some of which can be derived from aircraft position, possibly in combination with other sensor inputs such as an airspeed indicator. Aircraft data 64 includes, in embodiments, position, velocity, heading, pitch and roll of ownship aircraft.

Cockpit display system 40 includes target area determination module 16. In embodiments, target area determination module 16 is configured to adaptively (in terms of both size and position) determine target area based on traffic data 50 (specifically at least position of ground traffic) and to output corresponding target area data 58. That is, target area determination module 16 is configured to receive EVS imaging data 56 from EVS Camera 12 and traffic data 50 from traffic computer 14 and to define one or more target areas 306 (see FIGS. 3b to 3e) based on at least a position of the ground traffic as defined by ground traffic data 50. In embodiments, target area determination module 16 is configured to transform the position data from real world space to imaging space of the EVS imaging data 56 and to subsequently define the target area 306 around the position of the ground traffic position in imaging space. A size of the target area 306 is adaptable based at least on position such that farther away ground vehicles have a smaller target area defined therearound in imaging space (although this may transform to a same target area size in real word space). In embodiments, the target area 306 in the EVS imaging data 56 is determined based on both position and velocity data for the ground vehicle as derived from the ground traffic data 50. For example, larger target areas may be required for faster moving ground vehicles. In embodiments, the target area 306 is set based on a function that transforms speed and position of ground traffic in real space into a target area in the EVS imaging data 56 that is as small as possible, whilst minimizing a possibility to not encompass the ground vehicle in the target area by taking into account traffic data accuracy and predetermined latency of the position and velocity data.

In some embodiments, airport data 52 is received from airport database 20 that defines valid regions (such as runways, taxiways and any other laid surface at the airport made for transport of ground vehicles) for ground traffic. Target area 306 can be reduced by target area determination module 16 so as to exclude non-valid regions for ground traffic according to the airport data 52. In this way, target area determination module 16 is able to minimize a size of the target area 306 so as to reduce search space and amount of graphics processing required by graphics processing module 18. Target area 306 is defined in target area data 58 and output by target area determination module 16. For example, target area data may be a vector of imaging coordinates (e.g. x, y) representing a center or other single point of target area 306 and dimensions of target area (e.g. in the x and y directions) defining the size of the target area 306 to be drawn around the imaging coordinates. Although a size adaptive generation of target area 306 is beneficial for allowing minimization of the target area, processing power can be saved by having a predetermined size target area in other embodiments. Target area 306 represents a likely position of ground traffic vehicle 304 in EVS imaging data 56 based on ground traffic data 50 and a zone of uncertainty that is set based on ground traffic vehicle speed, inherent latency of ground traffic data 50 and inherent inaccuracy of position of ground traffic data 50.

Figure 3A:
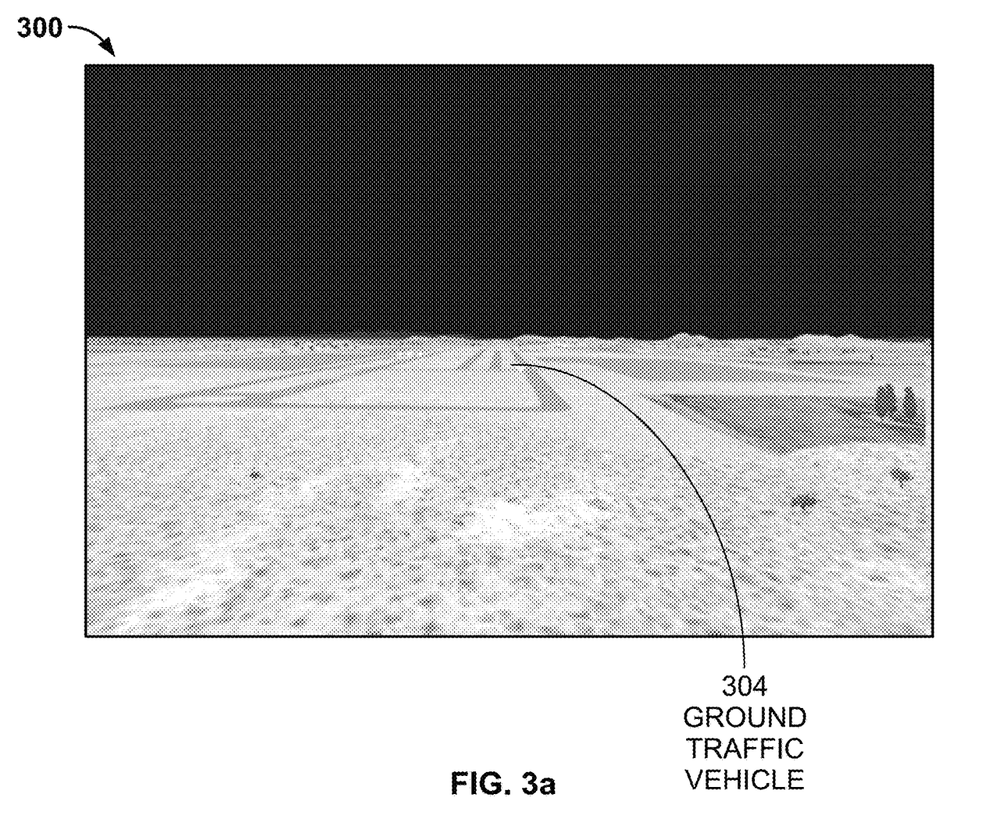
FIGS. 3a to 3f provide a sequence of EV images as a result of various graphics processing steps described herein, in accordance with embodiments of the present disclosure.
Figure 3B:
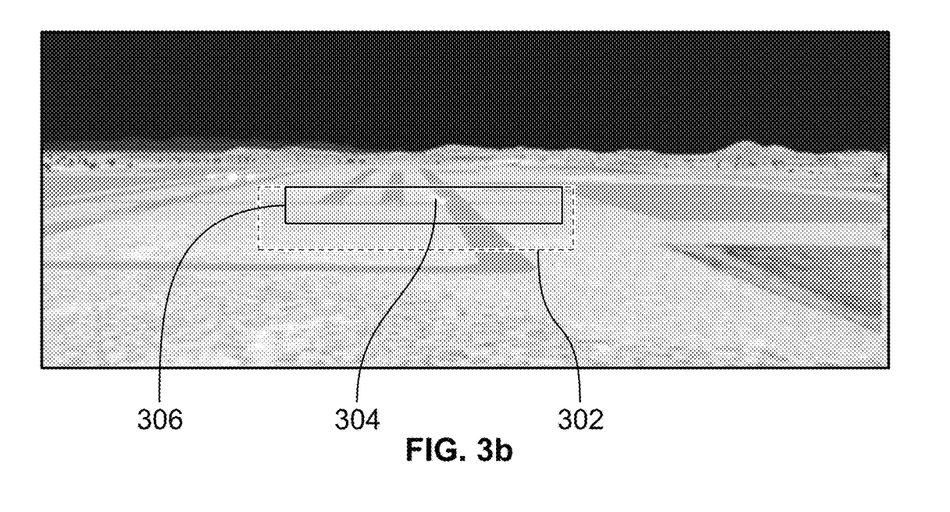

FIGS. 3a to 3b provide an illustration of processing steps performed by target area determination module 16. FIG. 3a illustrates a representation of EVS imaging data 56 as received by EVS Camera 12, which can form the basis for an enhanced vision display. As described further herein, EVS imaging data 56 is, in embodiments, augmented in various ways to produce a combined vision display for output on display device 30. EVS representation 300 illustrates a traffic intruder (or ground traffic vehicle) 304 on a runway. Ground traffic vehicle 304 reports its position and speed and other data, which is received and processed by traffic computer 14. Traffic computer 14 determines a SURF IA alert associated with ground traffic vehicle 304 and outputs, to target area determination module 16, ground traffic data 50. As shown in FIG. 3b, target area determination module 16 is configured to define, in target area data 58, a first target area 302 based on position and velocity of ground traffic 304 derived from ground traffic data 50. First target area 302 is drawn around ground traffic 304 in EVS imaging space based on a transformed position of ground traffic 304. The size of first target area 302 is determined based on velocity of ground traffic 304 and so as to take into account predetermined latency and accuracy of ground traffic data 50. Whilst this defines a relatively small target area for further processing, the area can be reduced further still according to second target area 306 by reducing the size of the first target area 302 in a way that excludes invalid regions for ground traffic, which is derived from airport data 52 from airport database 20. The second target area 306 is shown as a rectangle in the present embodiment. However, more complicated shape target areas can be defined in target area data 58 that more closely confirms to valid road surfaces for ground traffic to even further reduce the size of the target area.

Referring back to FIG. 1, cockpit display system 40 includes a graphics processing module 18 configured to receive target area data 58 defining target area 306 and EVS imaging data 56. Graphics processing module 18 is configured to perform one or more graphics processing operations on only the target area 306 portion of EVS imaging data 56, to thereby efficiently generate enhanced EVS imaging data 60. Enhanced EVS imaging data 60 includes at least two dimensions of pixel values making up the target area 306, at least some of which have been modified as compared to the corresponding pixel values in the EVS imaging data 56 as a result of graphics processing operations. In some embodiments, graphics processing module 18 includes a target area extraction sub-module 34 configured to extract the target area 306 (or target areas) from the remaining EVS imaging data 56 for subsequent graphics processing operations.

In embodiments, graphics processing module 18 includes a contrast enhancement and edge detection sub-module 24 configured to perform at least one of contrast enhancement and edge detection on the target area 306 of EVS imaging data 56. A variety of contrast enhancement methods are available including automatic gain control- (AGC-) and histogram equalization- (HE-) based methods. AGC method removes extreme values (e.g., 2% minimum and maximum of the total pixel number) and linearly maps the middle range of values onto an 8-bit domain for display. Histogram equalization normalizes the intensity distribution by using its cumulative distribution function to make the output image tend to have a uniform distribution of intensity. A useful reference for contrast enhancement methods for infrared images can be found from "ANALYSIS OF CONTRAST ENHANCEMENT METHODS FOR INFRARED IMAGES" by Sprinkle Christian, December 2011. Edge detection graphics processing typically provides an object outline for quicker shape identification or for easier area identification in some applications. Edge detection can help to bring out an outline of an aircraft (or other ground traffic vehicles) better then viewing a typical noisy enhanced vision (typically InfraRed) camera image. This may help identifying the potential threat ground traffic target faster. Accordingly, edges or outlines of target may be enhanced in enhanced EVS imaging data 60) and overall contrast enhancement may be included in enhanced EVS imaging data 60. In embodiments, contrast enhancement and/or edge detection is performed throughout the entire target area 306.

Figure 3C:
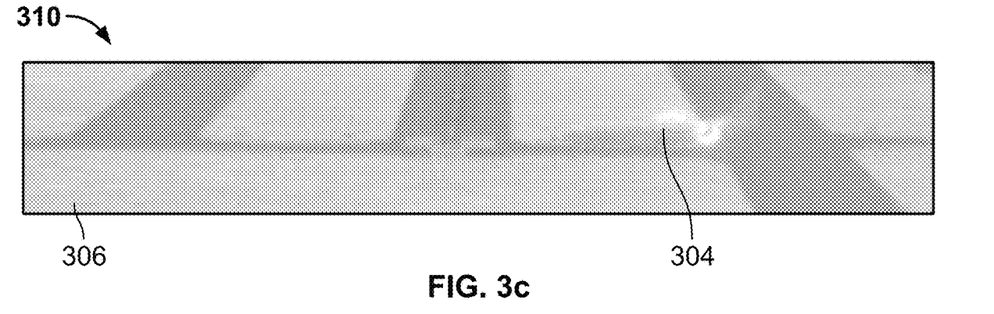
Figure 3D:
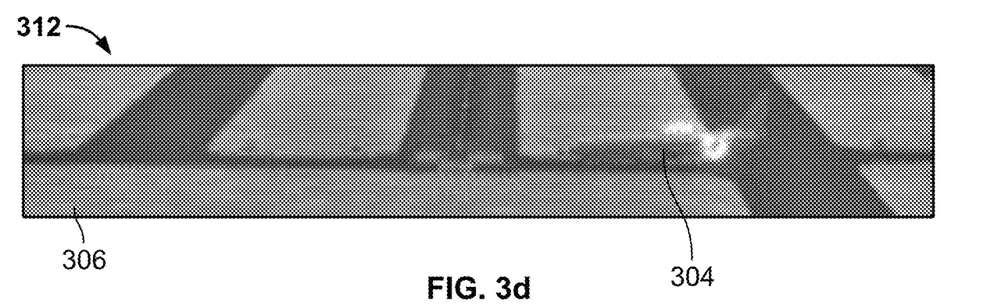

FIGS. 3c and 3d show exemplary images 310, 312 representing EVS imaging data 56 of target area 306 before (before image 310) contrast and/or edge detection graphics processing operations by contrast enhancement and/or edge detection sub-module 24 and after (after image 312) these graphics processing operations. In after image 312, overall contrast enhancement and delineation of edge or outlines can be seen, allowing a clearer identification of target ground traffic vehicle 304 for a viewer.

Cockpit display system 40 includes display generation module 28 and display device 30. Display device can be a head down display (HDD), a head up display (HUD), a wearable HUD, a portable display or any combination thereof. In embodiments, display device 30 is a primary flight display of the cockpit system, providing an out of the window view that is partly synthetic (e.g. with instrument readings based on aircraft data 64 and optionally graphical augmentations based on airport data 52, terrain data (not shown), etc.) and partly based on EVS imaging data 56. Display generation module 28 is configured to overlay or otherwise combine EVS imaging data 56, synthetic data sources (e.g. aircraft data 64 and/or airport data 52) and enhanced EVS imaging data 60 from graphics processing module 18.

Figure 3E:
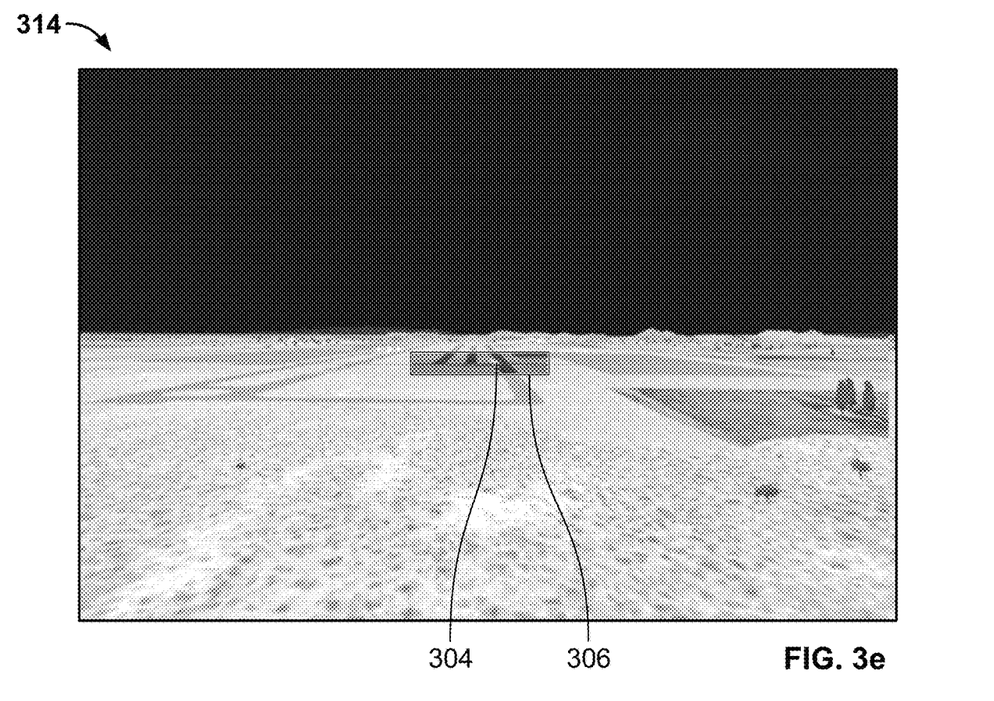

Referring to FIG. 3e an exemplary display 314 by display device 30 (without synthetic features for clarity) is constructed by display generation module 28 based on enhanced EVS imaging data 60 in target area 306 and based on EVS imaging data 56 surrounding the target area 306 such that target area 306 is differentiable to the viewer relative to its surroundings. In some embodiments, target area 306 outline is differentiable solely by differentiating effects produced by contrast and edge enhancement performed by graphics processing module 18. In other embodiments, a synthetic outline is added (e.g. a graphical line that may be colored different from surroundings) to clearly differentiate the target area 306. In this way, a realistic EV display is provided on display device that properly represents ground situation and which clearly designates the target area of interest so as to alert the pilot as to the ground traffic. Furthermore, target ground traffic vehicle 304 within target area may be more easily viewed as a result of processing by graphics processing module 18.

Referring to FIG. 1, graphics processing module 18 includes, in some embodiments, template matching and outline highlighting sub-module 26 in addition to, or as an alternative to, contrast enhancement and/or edge detection sub-module 24. Template matching and outline highlighting sub-module 26 is configured to retrieve aircraft model data 54 from aircraft model database 22 for an aircraft model (or other ground traffic vehicle model) corresponding to a type of aircraft (or other ground traffic vehicle) identified by traffic data 50. Template matching and outline highlighting sub-module 26 is configured to scale and rotate the aircraft model based on relative orientations (including heading, bearing and attitude) and positions of ownship aircraft and ground aircraft and to perform a matching algorithm to positionally match the aircraft template and the ground traffic in the target area 306. Since the matching algorithm is restricted to the target area 306 defined by the target area data 58, searching required by the matching algorithm can be more efficiently performed.

In one embodiment, template matching and outline highlighting sub-module 26 is configured to perform scaling of the aircraft model (aircraft template) based on relative position and distance of the target aircraft and ownship as derived from traffic data 50 and aircraft data 64. An aircraft size $W_2$ in EVS image is calculated by equation 1:

$$W_2 = (L_2 * \mathrm{Cot}(c)/L_1) * W_1 \qquad \text{(equation 1)}$$

$L_2$ is aircraft length in real world (obtainable from aircraft model database 22), Angle c is relative bearing angle between target heading and perpendicular line of ownship and $W_1$ is EV system image width which is a constant for a particular system. L1 represents a length of EVS image width in real world which is calculated according to equation 2:

$$L_1 = 2*(D_1/\mathrm{Cos}(a))*\mathrm{Cot}(b) \qquad \text{(equation 2)}$$

D1 is distance from Ownership to target which is calculated based on positions of Ownship and target, Angle a is bearing of target position to the ownership heading line, and Angle b is view angle of EVS image which is a constant for this system. The aircraft model is thus scaled according to equations 1 and 2 based on variables including size dimension(s) of target aircraft in real world as derived from aircraft model data 54, relative distance of target and ownship aircraft as derived from traffic data 50 and aircraft data 64, heading of ownship aircraft as derived from aircraft data 64 and bearing of target aircraft in target area 306 as derived from traffic data 50.

In embodiments, template matching and outline highlighting sub-module 26 is configured to perform rotation (in three dimensions) of the aircraft model based on the target aircraft heading as derived from traffic data 50 and ownship attitude which includes heading, pitch and roll as derived from aircraft data 64. That is, a relative orientation and heading of ownship aircraft and ground traffic vehicle 304 in target area 306 allows an angle of viewing by EVS Camera 12 of ground traffic vehicle 304 to be determined and thus a required rotation of aircraft model to be calculated.

Template matching and outline highlighting sub-module 26 is thus configured to scale and rotate the aircraft model according to position, heading and orientation data of ground traffic vehicle 304 and ownship aircraft as derived from traffic data 50 and aircraft data 64. The scaled and rotated version of the aircraft model is used in a subsequent template matching algorithm to positionally match aircraft model (or model of other ground vehicle) and target ground vehicle 304 in target area 306 of EVS imaging data 56. One exemplary template matching algorithm includes pattern matching between aircraft lights of scaled and rotated aircraft model (which is information derivable from aircraft model data 54) and captured lights of ground traffic vehicle 304 in target area 306 and thereafter matching an outline between scaled and rotated aircraft model and captured image of ground traffic vehicle 304 in target area 306 if aircraft lights matched. Other template matching algorithms could, however, be used such as suitable ones of those described in "Template Matching Advances and Applications in Image Analysis" by Hashemi et. Al, 23 Oct. 2016. Further, an artificial intelligence based template matching process could be utilized. Template matching includes searching for the best match throughout the entirety of the target area 306.

Figure 3F:
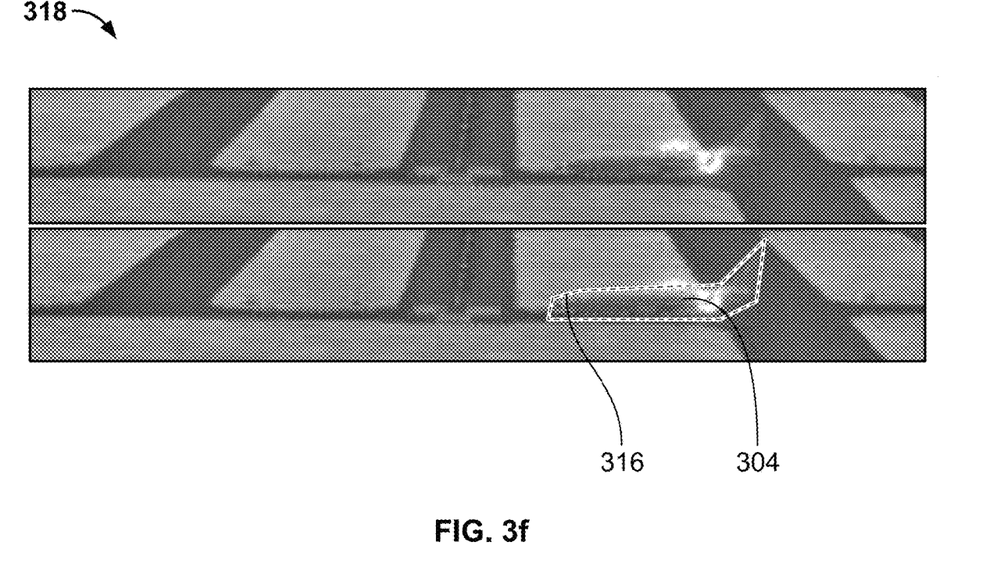

Having matched the outline of the aircraft model and the ground traffic vehicle, a realistic augmentation can be made to the EV imaging data 56 at the location of the ground traffic vehicle 304 that is realistically sized and shaped. This augmentation is performed by template matching and outline highlighting sub-module 26. In one example, an outline of the ground traffic vehicle is included in the EV imaging data 56 based on the scaled, rotated and template matched aircraft model. The outline extends around the ground traffic vehicle 304 as a graphical addition that surrounds pixel values based on EV imaging data 56. An exemplary outline graphic 316 is shown in image 318 of FIG. 3f extending around EV imaging data 56 (which has also been contrast and edge enhanced by contrast and/or edge detection sub-module 24) of ground traffic vehicle 304. Other graphical augmentations may be made such as outlining and color filling of the ground traffic vehicle 304 based on the scaled, rotated and template matched aircraft model or some other replacement of EVS imaging data (a matrix of pixel values) with a synthetic representation of the scaled, rotated and template matched aircraft model. However, outlining around an EVS image allows the EVS Camera captured image to be preserved for realistic interpretation by the viewer. In embodiments, display generation module 28 is configured to receive enhanced EVS imaging data 60 that includes contrast enhanced target area 306, edge enhanced target area 306 and/or graphical outlining around a ground traffic vehicle 304 in target area 306 and to generate a display for display device 30 based thereon.

Figure 2:
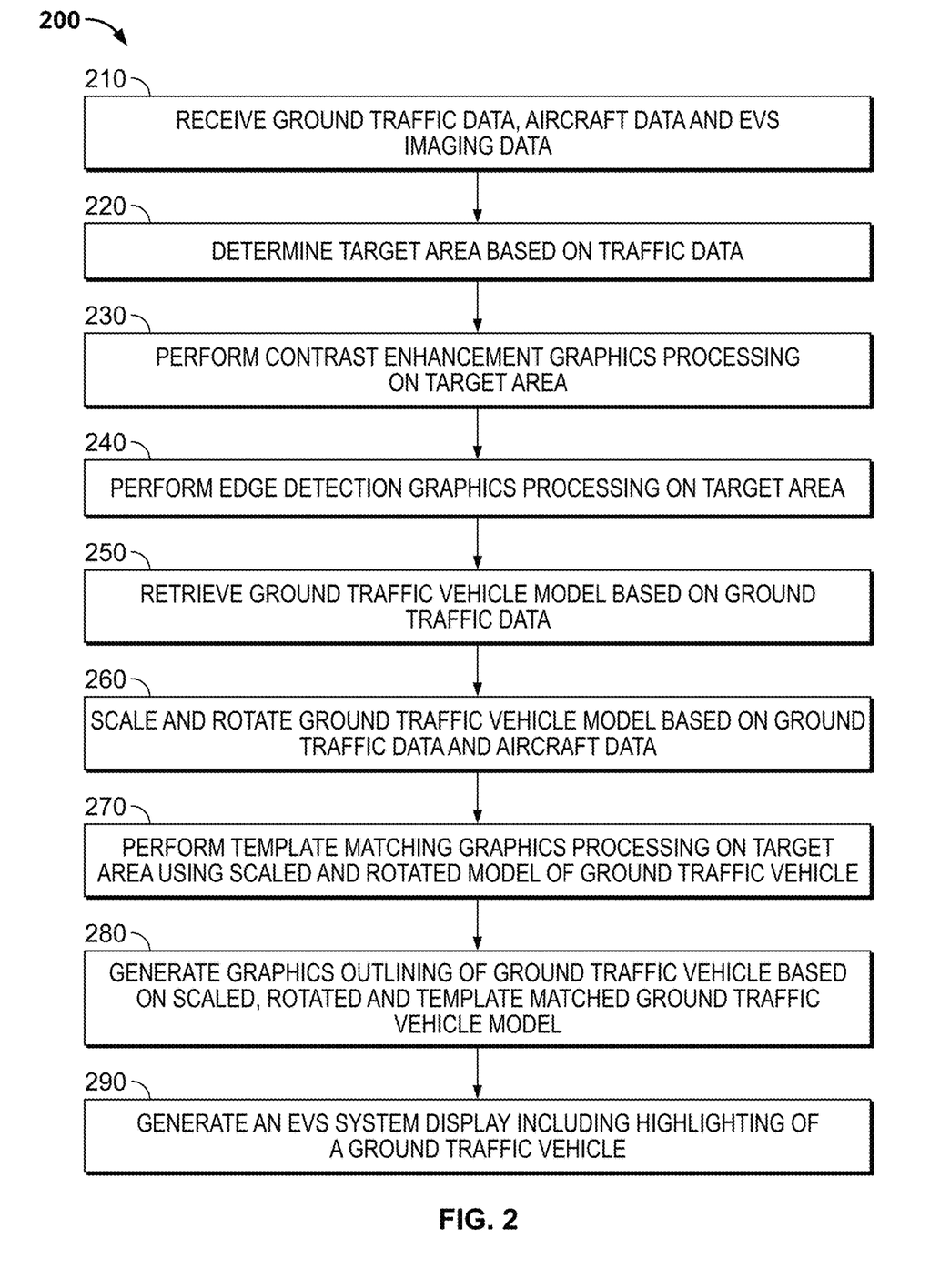
FIG. 2 illustrates a flowchart of a method of highlighting ground traffic in EV system displays, in accordance with embodiments of the present disclosure.

FIG. 2 illustrates a flowchart of a method 200 of generating a display highlighting ground traffic, in accordance with various exemplary embodiments. The various tasks performed in connection with method 200 may be performed by software (e.g. program instructions executed by one or more processors), hardware, firmware, or any combination thereof. For illustrative purposes, the following description of method 200 may refer to elements mentioned above in connection with FIGS. 1 and 3. It should be appreciated that method 200 may include any number of additional or alternative tasks, the tasks shown in FIG. 2 need not be performed in the illustrated order, and method 200 may be incorporated into a more comprehensive procedure or process having additional functionality not described in detail herein. Moreover, one or more of the tasks shown in FIG. 2 could be omitted from an embodiment of the method 200 as long as the intended overall functionality remains intact.

Method 200 includes step 210 of receiving ground traffic data 50 from traffic computer 14 and EVS imaging data 56 from EVS camera 12. EVS imaging data 56 includes, in embodiments, thermal imaging data and is provided in the form of at least a two-dimensional map of pixel values. Method 200 includes a step 220 of determining a target area 306 in EVS imaging data 56 based on at least position of ground traffic vehicle 304 derived from ground traffic data 50. Step 220, performed by target area determination module 16, includes defining a target area 306 within the EVS imaging data 56 that surrounds a ground target vehicle 304 identified in the ground traffic data 50 as intruding on a runway or otherwise representing a ground traffic safety threat. Target area 306 is defined, in some embodiments, not only with respect to position, but also taking into account speed and latency of ground traffic data 56. That is not only is position of target area 306 defined with respect to position of ground traffic vehicle 304, but size of the target area 306 is set depending on speed of ground traffic vehicle 304, distance between ownship and ground traffic vehicle 304 and latency of ground traffic data 50. Target area 306 is sized so as to correspond to uncertainty in position of ground traffic vehicle 304 that is inherent in ground traffic data 50 (in terms of inherent data inaccuracy and inherent latency and speed of ground traffic vehicle 304). In embodiments, target area 306 is reduced in size, when possible, by excluding invalid regions (e.g. regions outside of road surfaces) for ground traffic vehicles based on airport data 52 from airport database 20. Method step 220 thus provides target area data defining size and position of target area 306 within EVS imaging data 56 for use by graphics processing module 18. Graphics processing module 18 performs various graphics processing operation on the entirety of (throughout) the target area 306 such as contrast enhancement, edge or outline enhancement, searching of a template matching operation and optionally other additional or alternative graphics processing operations.

In step 230, contrast enhancement graphics processing is performed, by contrast enhancement and/or edge detection sub-module 24, on EVS imaging data only in target area 306 defined by target area data 58. In some embodiments, EVS imaging data making up target area 306 is extracted from the EVS imaging data 56 for use in subsequent graphics processing steps 230, 240, 270. In step 240, edge detection graphics processing is performed on EVS imaging data making up target area 306. In some embodiments, graphic outlining is added to target area 306. Steps 220, 230 serve to enhance visibility of ground traffic vehicle 304 in the target area 306 (by enhanced contrast and more clearly delineated edges) and also serve to differentiate EVS imaging data of target area 306 from surrounding EVS imaging data (through sharper image in the target area 306 and through optional graphical outlining of target area 306) when an EV system display is generated based thereon, as illustrated in FIG. 3e.

In some embodiments, additional or alternative graphics processing is performed on EVS imaging data making up target area 306 by template matching and outline highlighting sub-module, as described in steps 250 to 280. In step 250, aircraft model data 54 representing a model of ground traffic vehicle 304 is retrieved based on an identifier for ground traffic vehicle 304 included in ground traffic data 50. The model of ground traffic vehicle 304 is rotated and scaled in step 260 based on ground traffic data 50 and aircraft data 64. In particular, a viewing angle of ground traffic vehicle 304 by EVS camera 12 is determined based on relative position and heading of ground traffic vehicle 304 and ownship and orientation of ownship to determine required scaling and rotation of model of ground traffic vehicle for efficient template matching. In step 270, template matching graphics processing is performed on target area 306 using scaled and rotated model of ground traffic vehicle. EVS imaging data making up target area 306 is searched and a matching operation is performed using scaled and rotated model of ground traffic vehicle 304. Step 280 produces matching data defining shape, size and position of matching model of ground traffic vehicle.

Method 200 includes step 290 in which an EV system display is generated, by display generation module 28, including highlighting of ground traffic vehicle 304, based on enhanced EVS imaging data from graphics processing module 18. In embodiments, highlighting of ground traffic vehicle 304 includes contrast and edge enhanced target area 306 with graphical outlining of target area 306, which are defined in enhanced EVS imaging data 60. In additional or alternative embodiments, matching data produced in step 280 is used to graphically highlight ground traffic vehicle 304 within target area 306 by outlining the ground traffic vehicle 304 or otherwise synthetically differentiating it, which is defined in enhanced EVS imaging data 60. In embodiments, a combined vision display is produced by display generation module 28 that is based on a combination of enhanced EVS imaging data 60 in target area 306 and EVS imaging data 56 outside of target area 306, aircraft data 64 (e.g. speed and altitude tapes, heading indicator, etc.) and optionally terrain and/or airport augmentations based on airport data 52 and terrain data from a terrain database (not shown).

The present disclosure provides a display output on display device 30 that is largely based on EVS imaging data, with highlighting concerning location of a ground traffic intruder. The highlighting is determined based on graphics processing of the EVS imaging data itself rather than being only based on reported coordinates of a ground traffic vehicle, which allows accurate and realistic highlighting to improve situational awareness. Highlighting based only on ADSB data from the ground traffic vehicle 304 may be insufficiently precise or may not properly report the lack of precision and thereby provide misleading displays. In the present disclosure, the target area 306 and any outlining of the ground traffic vehicle 304 is reliant on the EVS imaging data and thus allows true position of the ground traffic vehicle 304 in the image to be visualized. Further, graphics processing is confined to the target area 306 to ensure processing efficiency and fast response times.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An aircraft display system for highlighting ground traffic, the aircraft display system comprising:
   a display device; and
   at least one processor in operable communication with the display device, the at least one processor configured to execute program instructions, wherein the program instructions are configured to cause the at least one processor to:
   receive ground traffic data from a traffic computer, the ground traffic data including position bearing and heading data for the ground traffic and aircraft tail number for the ground traffic at an airport;

receive enhanced vision system, EVS, imaging data from at least one EVS camera;
receive airport data defining valid regions for the ground traffic;
determine a target area in the EVS imaging data based on the position data of the ground traffic data and the valid regions of the airport data;
reduce the target area to exclude regions outside of road surfaces of the airport;
perform graphics processing that is confined to the target area to enhance visibility of the ground traffic in the EVS imaging data in the target area, thereby generating enhanced EVS imaging data, wherein the graphics processing is selected from at least one of contrast enhancement, edge detection and template matching;
retrieve an aircraft model from an aircraft model database using the aircraft tail number for the ground traffic, wherein the aircraft model corresponds to a type of aircraft identified by the aircraft tail number;
scale and rotate the aircraft model based on a distance between ownship aircraft and the ground traffic using the position data for the ground traffic and ownship position data, the scaling being based on the distance and relative bearing angle between the ownship aircraft and the ground traffic using the position data and the bearing data for the ground traffic and ownship position and heading data and the rotating being based on the heading data for the ground traffic and ownship attitude data including heading, pitch, and roll data;
match lights of the scaled aircraft model and lights in the EVS imaging data in the target area as part of the graphics processing to positionally match the ground traffic in the EVS imaging data and the aircraft model; and
generate the display to be displayed on the display device based on the EVS imaging data including highlighting ground traffic outline in the target area based on the scaled, rotated, and positionally matched aircraft model.

2. The aircraft display system of claim 1, wherein the ground traffic data from the traffic computer is Automatic Dependent Surveillance Broadcast (ADSB) data, is derived from onboard sensor data, or is uplinked from a ground based surveillance system.

3. The aircraft display system of claim 1, wherein the ground traffic data includes the position data and velocity data for the ground traffic and the program instructions are configured to cause the at least one processor to determine the target area in the EVS imaging data based on the position data and the velocity data of the ground traffic data and predetermined latency of the position data and the velocity data.

4. A method of operating an aircraft display system, the method comprising:
receiving, via at least one processor, ground traffic data from a traffic computer, the ground traffic data including position data for ground traffic;
receiving, via the at least one processor, enhanced vision system, EVS, imaging data from at least one EVS camera;
receiving, via the at least one processor, airport data defining valid regions for the ground traffic;
determining, via the at least one processor, a target area in the EVS imaging data based on the position data of the ground traffic data and the valid regions of the airport data;
reducing, via the at least one processor, the target area to exclude regions outside of road surfaces of the airport;
performing, via the at least one processor, graphics processing that is confined to the target area to enhance visibility of the ground traffic in the EVS imaging data in the target area, thereby generating enhanced EVS imaging data, wherein the graphics processing is selected from at least one of contrast enhancement, edge detection and template matching and highlighting of an outline of the ground traffic;
retrieving, via the at least one processor, an aircraft model from an aircraft model database using the aircraft tail number for the ground traffic, wherein the aircraft model corresponds to a type of aircraft identified by the aircraft tail number;
scaling and rotating, via the at least one processor, the aircraft model based on a distance between ownship aircraft and the ground traffic using the position data for the ground traffic and ownship position data;
matching, via the at least one processor, lights of the scaled aircraft model and lights in the EVS imaging data in the target area as part of the graphics processing to positionally match ground traffic in the EVS imaging data and the aircraft model; and
generating, via the at least one processor, the display to be displayed on the display device based on the EVS imaging data including the highlighting ground traffic outline in the target area based on the scaled and positionally matched aircraft model.

5. The method of claim 4, wherein the ground traffic data from the traffic computer is Automatic Dependent Surveillance Broadcast (ADSB) data.

6. The method of claim 4, further comprising:
receiving, via the at least one processor, the ground traffic data including the position data and bearing and heading data for the ground traffic;
scaling and rotating, via the at least one processor, the aircraft model, the scaling being based on a distance and relative bearing angle between ownship aircraft and the ground traffic using the position data and bearing data for ground traffic and ownship position and heading data and the rotating being based on the heading data for ground traffic and ownship attitude data including heading, pitch and roll data; and
generating, via the at least one processor, the display to be displayed on the display device based on the EVS imaging data including the highlighting ground traffic outline in the target area based on the scaled and rotated aircraft model.

7. The method of claim 4, wherein the ground traffic data includes the position data and velocity data for the ground traffic and the program instructions are configured to cause the at least one processor to determine the target area in the EVS imaging data based on the position data and the velocity data of the ground traffic data and predetermined latency of the position data and the velocity data.

* * * * *